United States Patent
Peng et al.

(10) Patent No.: US 8,702,940 B2
(45) Date of Patent: *Apr. 22, 2014

(54) INCREASED MOLECULE CAPTURE RATE INTO A NANOPORE

(75) Inventors: Hongbo Peng, Chappaqua, NY (US); Gustavo A. Stolovitzky, Riverdale, NY (US); Deqiang Wang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/570,600

(22) Filed: Aug. 9, 2012

(65) Prior Publication Data

US 2014/0027287 A1 Jan. 30, 2014

Related U.S. Application Data

(63) Continuation of application No. 13/559,752, filed on Jul. 27, 2012.

(51) Int. Cl.
*G01N 27/447* (2006.01)
*G01N 27/453* (2006.01)
*B82Y 35/00* (2011.01)

(52) U.S. Cl.
USPC ...... 204/450; 435/6.1; 435/287.2; 435/287.1; 422/68.1; 422/82.01; 977/920; 977/904; 977/953; 977/958; 204/600

(58) Field of Classification Search
USPC .............. 204/400, 547, 600, 643, 549; 435/6, 435/287.1, 287.2, 6.1; 977/723, 720, 781, 977/904, 920, 953, 958; 422/68.1, 82.01
See application file for complete search history.

(56) References Cited

U.S. PATENT DOCUMENTS

| | | | |
|---|---|---|---|
| 7,615,762 B2* | 11/2009 | Satyanarayana et al. | .. 250/461.2 |
| 2006/0246497 A1 | 11/2006 | Huang et al. | |

(Continued)

FOREIGN PATENT DOCUMENTS

| | | |
|---|---|---|
| EP | 2039433 A1 | 3/2009 |
| WO | WO2012033524 A2 | 3/2012 |

OTHER PUBLICATIONS

R. Akeson, "Microsecond Timescale Discrimination Among Polycytidylic Acid, Polyadenylic Acid, and Polyuridylic Acid as Homopolymers or as Segments Within Single RNA Molecules," Biophys, J. 77 3227-33 (1999).

(Continued)

*Primary Examiner* — Jennifer Dieterle
(74) *Attorney, Agent, or Firm* — Cantor Colburn LLP; Vazken Alexanian

(57) ABSTRACT

A mechanism for capturing molecules is provided. A nanopore through a membrane separates a first chamber from a second chamber, and the nanopore, the first chamber, and the second chamber are filled with ionic buffer. A narrowed neck is at a middle area of the first chamber, and the narrowed neck is aligned to an entrance of the nanopore. The narrowed neck has a high intensity electric field compared to other areas of the first chamber having low intensity electric fields. The narrowed neck having the high intensity electric field concentrates the molecules at the middle area aligned to the entrance of the nanopore. Voltage applied between the first chamber and the second chamber drives the molecules, concentrated at the entrance of the nanopore, through the nanopore.

20 Claims, 5 Drawing Sheets

(56) References Cited

U.S. PATENT DOCUMENTS

| | | | |
|---|---|---|---|
| 2007/0161028 | A1 | 7/2007 | Schwartz et al. |
| 2007/0190542 | A1 | 8/2007 | Ling et al. |
| 2009/0136958 | A1 | 5/2009 | Gershow et al. |
| 2010/0066348 | A1* | 3/2010 | Merz et al. ............ 324/71.1 |
| 2010/0331194 | A1 | 12/2010 | Turner et al. |
| 2011/0031389 | A1 | 2/2011 | Reed et al. |
| 2011/0076665 | A1* | 3/2011 | Gatenholm et al. ............ 435/1.1 |
| 2011/0155574 | A1 | 6/2011 | Golovchenko et al. |
| 2011/0162963 | A1 | 7/2011 | Hibbs et al. |

OTHER PUBLICATIONS

Charles L. Asbury, et al., "Trapping of DNA by Dielectrophoresis," Electrophoresis 2002, 2658-2666.

Branton D., et al., The potential and Challenges of Nanopore Sequencing Nature Biotechnology 26(10) 1146-1153 (2008).

Chia-Fu Chou, et al., "Electrodeless Dielectrophoresis of Single- and Double-Stranded DNA, "DNA Biophysical Journal vol. 83 2170-2179 (2002).

Gracheva M. E., et al., "Simulation of the Electric Response of DNA Translocation through a Semiconductor Nanopore-capacitor," Nanotechnology 17 622-633 (2006).

Alexander Grosberg and Yitzhak Rabin, "DNA Capture into a Nanopore: Interplay of Diffusion and Electrohydrodynamics," The Journal of Chemical Physics 133, 165102, pp. 1-15 (2010).

Heng J. B., et al., "Sizing DNA Using a Nanometer-diameter Pore," Biophys. J. 87 2905-91 (2004).

Y. Huang and R. Pethig, "Electrode Design for Negative Dielectrophoresis, "Meas. Sci. Technol. 2 (1991) 1142-1146.

Kasianowicz, et al., "Characterization of Individual Polynucleotide Molecules Using a Membrane Channel," Proc. Natl Acad. Sci. USA 93 13770-773 (1996).

Lagerqvist J., et al., "Fast DNA Sequencing Via Transverse Electronic Transport," Nano Lett. 6 779-782 (2006).

Meller A, et al., "Rapid Nanopore Discrimination Between Single Polynucleotide Molecules," Proc. Natl Acad. Sci. USA 97 1079-84 (2000).

H. Morgan, et al., "Separation of Submicron Bioparticles by Dielectrophoresis," Biophysical Journal, vol. 77, Jul. 1999, 516-525.

Song G and Meller A., "Progress Towards Ultrafast DNA Sequencing Using Solid State Nanopores, "Clin. Chem. 3 1996-01 (2007).

International Application No. PCT/US2013/043279 filed May 30, 2013; Applicant's Ref. No. YOR912511PCT; Notification of Transmittal of The International Search Report and The Witten Opinion of the International Searching Authority, or the Declaration; date of mailing Nov 22, 2013; pp. 1-8.

International Application No. PCT/US2013/043279 filed May 30, 2013; Applicant's Ref. No. YOR912511PCT; Written Opinion of the International Searching Authority; date of mailing Nov. 22, 2013; pp. 1-8.

* cited by examiner

INCREASED MOLECULE CAPTURE RATE INTO A NANOPORE

This application is a continuation of U.S. non-provisional application Ser. No. 13/559,752 filed Jul. 27, 2012, the contents of which are incorporated in their entirety by reference herein.

BACKGROUND

The present invention relates to increasing the capture rate of molecules, and more specifically, to increasing the molecule capture rate in a nanopore via dielectrophoresis.

Nanopore sequencing is a method for determining the order in which nucleotides occur on a strand of deoxyribonucleic acid (DNA). A nanopore (also referred to a pore, nanochannel, hole, etc.) can be a small hole in the order of several nanometers in internal diameter. The theory behind nanopore sequencing is about what occurs when the nanopore is immersed in a conducting fluid (e.g., ionic buffer) and an electric potential (voltage) is applied across the nanopore. Under these conditions, a slight electric current due to conduction of ions through the nanopore can be measured, and the amount of current is very sensitive to the size and shape of the nanopore. If single bases or strands of DNA pass (or part of the DNA molecule passes) through the nanopore, this can create a change in the magnitude of the current through the nanopore. Other electrical or optical sensors can also be positioned around the nanopore so that DNA bases can be differentiated while the DNA passes through the nanopore.

The DNA can be driven through the nanopore by using various methods. For example, an electric field might attract the DNA towards the nanopore, and it might eventually pass through the nanopore. The scale of the nanopore can have the effect that the DNA may be forced through the hole as a long string, one base at a time, like thread through the eye of a needle. Recently, there has been growing interest in applying nanopores as sensors for rapid analysis of biomolecules such as deoxyribonucleic acid (DNA), ribonucleic acid (RNA), protein, etc. Special emphasis has been given to applications of nanopores for DNA sequencing, as this technology holds the promise to reduce the cost of sequencing below $1000/human genome. Two issues in nanopore DNA sequencing are controlling the translocation of DNA through the nanopore and differencing individual DNA bases.

SUMMARY

According to an embodiment, a method for increasing the rate of capturing molecules into the nanopore is provided. The method includes providing a nanopore through a membrane separating a first chamber from a second chamber. The nanopore, the first chamber, and the second chamber are filled with ionic buffer. The method includes providing a narrowed neck at a middle area of the first chamber, where the narrowed neck at the middle area is aligned to an entrance of the nanopore. Also, the method includes configuring the narrowed neck to have a high intensity electric field as compared to other areas of the first chamber having low intensity electric fields, and configuring the narrowed neck to have the high intensity electric field for concentrating the molecules at the middle area aligned to the entrance of the nanopore. Voltage applied between the first chamber and the second chamber drives the molecules, concentrated at the entrance of the nanopore, through the nanopore.

According to an embodiment, a system for capturing molecules is provided. The system includes a nanopore through a membrane separating a first chamber from a second chamber. The nanopore, the first chamber, and the second chamber are filled with ionic buffer. The system includes a narrowed neck at a middle area of the first chamber, in which the narrowed neck at the middle area is aligned to an entrance of the nanopore. The narrowed neck has a high intensity electric field compared to other areas of the first chamber having low intensity electric fields. The narrowed neck having the high intensity electric field concentrates the molecules at the middle area aligned to the entrance of the nanopore. Voltage applied between the first chamber and the second chamber drives the molecules, concentrated at the entrance of the nanopore, through the nanopore.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

The present disclosure employs a method called dielectrophoresis to concentrate molecules at the entrance of a nanopore to increase the capture rate of the molecules into the nanopore for characterization at ultra-low concentration.

In state of the art nanopore sequencing, DNA diffuses to the entrance of the nanopore via thermal motion and then is captured into the nanopore by electrical field inside the nanopore as the electrical field across the nanopore is only present in the nanopore and near the entrance of the nanopore due to the fact that the resistance of the ionic buffer inside the nanopore is orders of magnitude larger than that of the ionic buffer outside of the nanopore. Thus a high concentration of DNA (and/or any type of molecule) is needed to grant a reasonable capture rate such as, e.g., 1 (one) capture per second of DNA into the nanopore. In order to lower DNA sequence cost further, one has to address ultra-low concentration of DNA samples.

An embodiment uses dielectrophoresis, which is a technique to use an alternating current (AC) electrical field to generate an electrical dipole on non-charged particles and/or charged dielectric particles and then uses a non-uniform electrical field to manipulate those particles (i.e., non-charged and/or charged molecules) as dipoles. The dipoles are subjected to a force exerted by the gradient of the electrical field and accordingly concentrate at the location with highest electrical field (such as the area 108 discussed herein with the highest electric field strength 315). The present disclosure utilizes dielectrophoresis technique (on the molecules) to concentrate molecules at the entrance of a nanopore to increase the capture rate of molecules into the nanopore.

Figure 1:
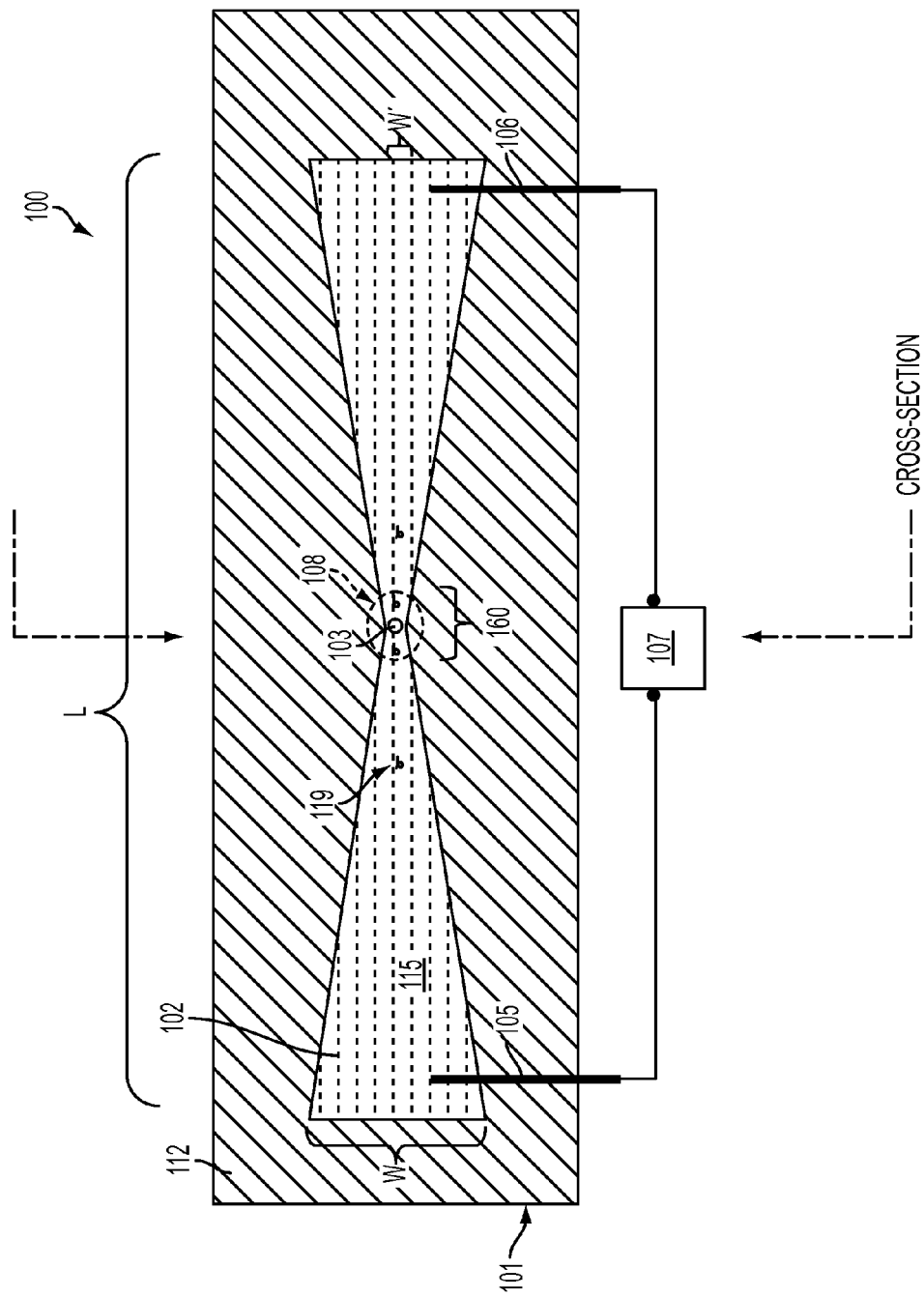
FIG. 1 is a schematic of a system which uses dielectrophoresis to increase the capture rate of molecules into a nanopore according to an embodiment.
Figure 2:
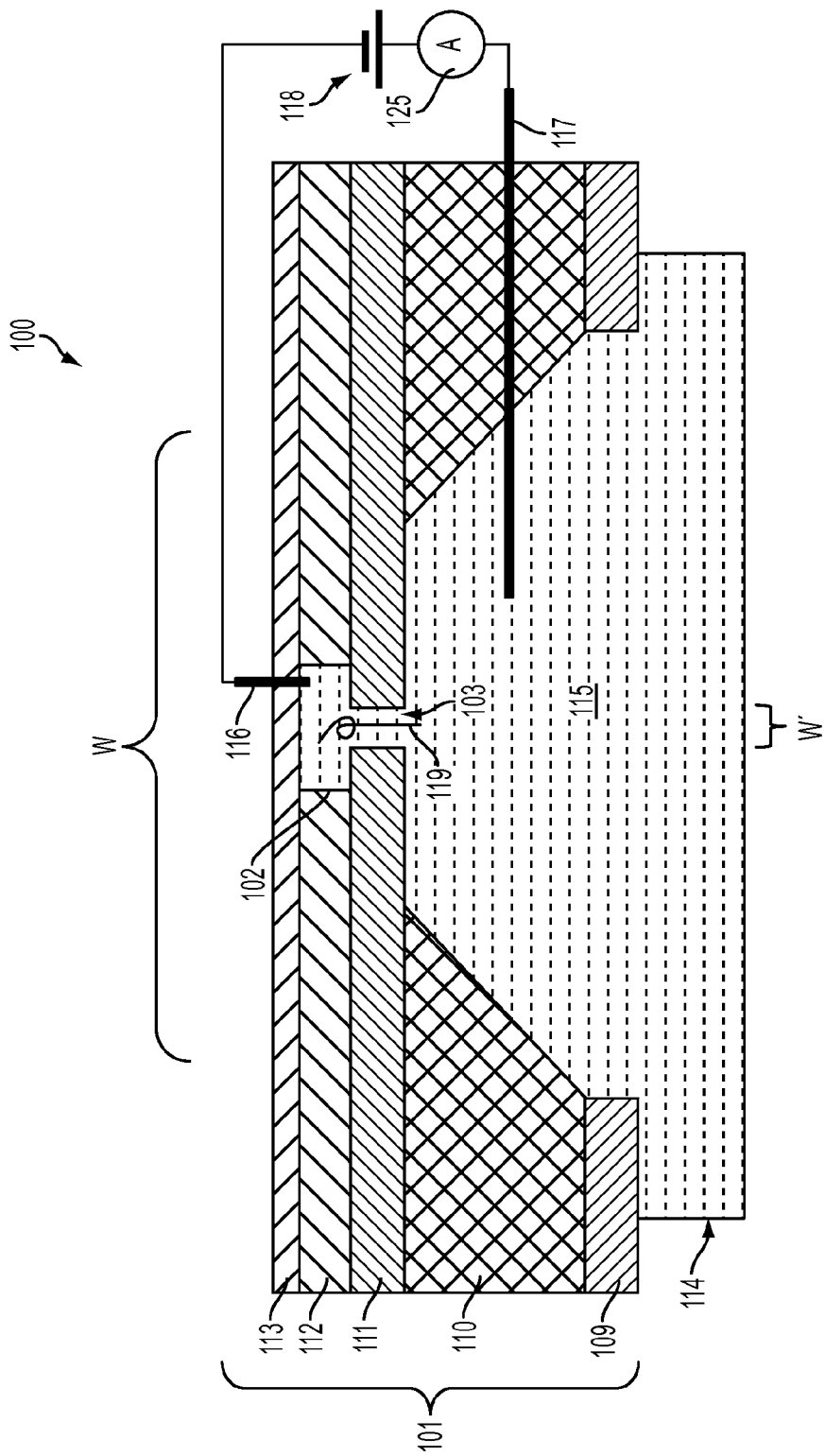
FIG. 2 is a schematic of the system from a cross-sectional view which uses dielectrophoresis to increase the capture rate of molecules according to an embodiment.

Referring now to the figures, FIG. 1 is a schematic of a system 100 using dielectrophoresis to increase the capture rate of DNA molecules into a nanopore according to an embodiment. FIG. 1 is the top view of the system 100 and FIG. 2 is a cross-sectional view of the system 100 according to an embodiment.

In FIG. 1, the system 100 includes a device 101 which has a micro-fluidic channel 102. The micro-fluidic channel 102 is filled with ionic buffer 115 and DNA molecules 119. A nanopore 103 is formed through the device 101 with its entrance at the narrowest part (i.e., a narrowed neck 160) of the micro-fluidic channel 102. The micro-fluidic channel 102 is formed in the shape of two triangles connected at their tops/tips. The base of the triangles may be (about) 1 mm (millimeter) represented as width W. The narrowest part (the narrowed neck 160) of micro-fluidic channel 102 in which the nanopore 103 is formed may be (about) 1 or 2 microns (micrometer), represented at width W'. The length of the micro-fluidic channel 102 may be (about) 1 or 2 mm (millimeters), represented as length L. Note that this is just one embodiment, in principle, any other shape of the fluidic channel 102 with a narrowest portion at the entrance of the nanopore 103 will work according teachings disclosed herein.

Two electrochemical electrodes 105 and 106, such as Ag/AgCl electrodes, are dipped in the ionic buffer 115 at the two opposite ends of the micro-fluidic channel 102. AC voltage of the voltage source 107 is applied between the two electrodes 105 and 106 to generate an electric field. The AC voltage (which could be DC voltage) of the voltage source generates the electric field from one end of the micro-fluidic channel 102 to the other.

Any charged particles and/or non-charged particles of the molecules 119 are polarized under this AC electric field either through the separation of the particle and it's counter ions (for charged particles) and/or through the polarization of the particle itself (for non-charged particle). This polarization creates an effective electrical dipole, and the dipole is subject to a force created by the gradient of the electrical field. As a result, these particles will concentrate at the area with the highest electrical field strength. In FIG. 1, the narrowest part of the micro-fluidic channel 102 has the highest electrical field (i.e., the highest electric field strength 315 shown in FIG. 3) as shown by an area/location 108, and thus DNA molecules 119 concentrate inside the area 108. The area 108 is where the entrance of the nanopore 103 is located, and this concentration of molecules 119 (by the highest electric field strength 315 in the narrowed neck 160) enhances/improve the capture rate of DNA molecules 119 into the nanopore 103. For the embodiment mentioned in the previous text, if all the DNA molecules 119 in the millimeter size channel 102 are concentrated at the 2 μm×2 μm area, the concentration of DNA molecules 119 at the entrance of the nanopore 103 will be increased $2.5 \times 10^5$ times (as one example). As the capture rate of DNA is proportional to the concentration of DNA molecules 119 at the entrance of the nanopore 103, the capture rate of DNA molecules 119 into nanopore 103 will be increased $2.5 \times 10^5$ times.

FIG. 2 shows the cross-sectional view of the device 101 and the experimental setup for translocation of molecules 119 (and/or DNA) through the nanopore 103 according to an embodiment. As further seen in FIG. 2, the device 101 includes many layers. Layer 110 is the substrate, such as Si. Layers 109 and 111 are electrically insulating material, such as $Si_3N_4$. A window can be opened through layer 109 by photolithography and reactive ion etching (RIE), and wet etching such as TMAH (tetramethylammonium hydroxide) or KOH (potassium hydroxide) can be used to open a window through the substrate 110 to create a free-standing membrane of layer 111 (without etching layer 111). Layer 112 is another electrically insulating material with (a different) etching selectivity to the material of layer 111 so that the micro-fluidic channel 102 can be etched into layer 112 while stopping on layer 111. In FIG. 2, the micro-fluidic channel 102 is illustrated in the layer 112.

The nanopore 103 (from sub-nm to 100 nm in diameter) is made through layer (membrane) 111 by transmission electron microscope, focused ion beam drilling, or reactive ion etching. Layer 113 is a cover made of any electrically insulating material such as PDMS (polydimethylsiloxane) to seal the micro-fluidic channel 102. Layer 113 is not shown in FIG. 1 so as not to obscure FIG. 1. FIG. 1 shows the top view as though the layer 113 has been lifted off, but it is understood that the layer 113 is present (but not visually shown).

Fluidic cell 114 is at the backside of the wafer (i.e., the back side of the substrate 110) and is filled with the same ionic buffer 115, as the micro-fluidic channel 102 on the front side. Two electrochemical electrodes 116 and 117, such as Ag/AgCl electrodes, are dipped in the ionic buffer 115 at the front side micro-fluidic channel 102 and the backside fluidic cell 114 respectively. Voltage of a voltage source 118 is applied between the two electrodes 116 and 117 to drive molecules 119 through the nanopore 103. Also, voltage of the voltage source 118 is utilized to generate ionic current measured by ammeter 125 through the nanopore 103, and the measured ionic current (via ammeter 125) is used to characterize the molecules 119 while in the nanopore 103. The ionic current measured by the ammeter 25 flows out through electrode 117, through the ionic buffer 115, through the nanopore 103 (where the molecule 119 in the nanopore 103 changes/affects the ionic current), back into the electrode 116, and then back into the voltage source 118.

Note that there are two ways to avoid cross-talking between the AC field created by voltage of the voltage source 107 and the ionic current (flowing through and measured by the ammeter 125) created by voltage of the voltage source 118:

In case (1), ionic current (measured by ammeter 125) can be measured while the AC field from voltage source 107 is (turned) off right after the DNA molecules 119 are concentrated at the entrance of the nanopore 103;

In case (2), AC field from voltage source 107 can be high frequency (such as MHz) while ionic current (measured by ammeter 125) can employ a low pass filter at 100 kHz.

As mentioned above, the molecules 119 will concentrate inside the area 108 where the entrance of the nanopore 103 is located. This will enhance the capture rate of molecules 119 into the nanopore 103. For example, normally it takes about 10 nM (nano Moles) concentration (e.g., high concentration) of DNA molecules to obtain a DNA molecule capture rate of around 1/second (1 DNA molecule per second). As mentioned previously in an embodiment, the concentration of DNA molecules 119 at the entrance of the nanopore 103 is increased $2.5 \times 10^5$ times if the AC field (by the voltage source 107) is applied in micro-fluidic nanochannel 102. Thus, the original concentration of DNA molecules loaded into nanochannel 102 can be as low (e.g., low concentration) as 40 fM (femto Moles or $4\times10^{-14}$ Moles).

Further discussion for a non-charged molecule 119 and for a charged molecule 119 is provided below. An electric dipole is a separation of positive and negative charges/particles. The simplest example of this is a pair of electric charges of equal magnitude but opposite sign, separated by some (usually small) distance (which occurs on the molecule 119 as discussed herein).

For the non-charged molecule 119, the (AC) voltage applied by voltage source 107 (via electrodes 105 and 106) polarizes the non-charged molecule 119 causing a dipole on the non-charged molecule 119. The electric field produced by the voltage of the voltage source 107 creates the dipole on the non-charged molecule 119, so that the high intensity electric field concentrates the molecules 119 (via their respective dipoles) in the area 108.

For the charged molecule 119, the ionic buffer 115 (such as a KCl solution) has mobile ions that tend to screen the charged molecule 119. These screening ions are called counter ions. The original charges on the charged molecule 119 and the counter ions form an electrical double layer as they are separated with some distance by the thermal agitation on the counter ions. This electrical double layer made of opposite charges is effectively a dipole. Plus, the polarization of the charged molecule 119 itself also adds additional dipole moment. Likewise, the electric field produced by the voltage of the voltage source 107 creates the high intensity electric field to concentrate the molecules 119 (via their respective dipoles) in the area 108.

As such, both the non-charged molecules 119 and the charged molecules 119 are dipoles in the system 100. The narrowing shape (i.e., narrowed neck 160) in the middle of the micro-fluidic channel 102 causes the molecules 119 (i.e., both the charged and non-charged molecules 119 with the dipoles) to concentrate in the area 108 (i.e., the entrance of the nanopore 103) when the voltage of voltage source 107 is applied. The concentrated molecules 119 are then driven (are captured) into the nanopore 103 by the electrical field created by voltage of the voltage source 118 across the nanopore 103. As the electrical resistance of the ionic buffer 115 in nanopore 103 is orders of magnitude larger than the ionic buffer 115 outside of the nanopore 103, almost all the voltage of the voltage source 118 is dropped on the ionic buffer 115 inside nanopore 103, and there is little (e.g., much less) electrical field (present) outside of the nanopore 103. So, the DNA molecules 119 make/fulfill a Brownian motion until they reach the entrance of the nanopore 103, and then the electrical field (via voltage source 118) inside the nanopore 103 is able to capture the DNA molecule 119 into the nanopore 103. As such, this explains why the capture rate of DNA molecules into the nanopore is proportional to the concentration of DNA and why we need to increase concentrates the DNA at the entrance of the nanopore. Brownian motion refers to random moving of particles suspended in a fluid (a liquid or a gas) resulting from their bombardment by the fast-moving atoms or molecules in the gas or liquid as understood by one skilled in the art.

Figure 3:
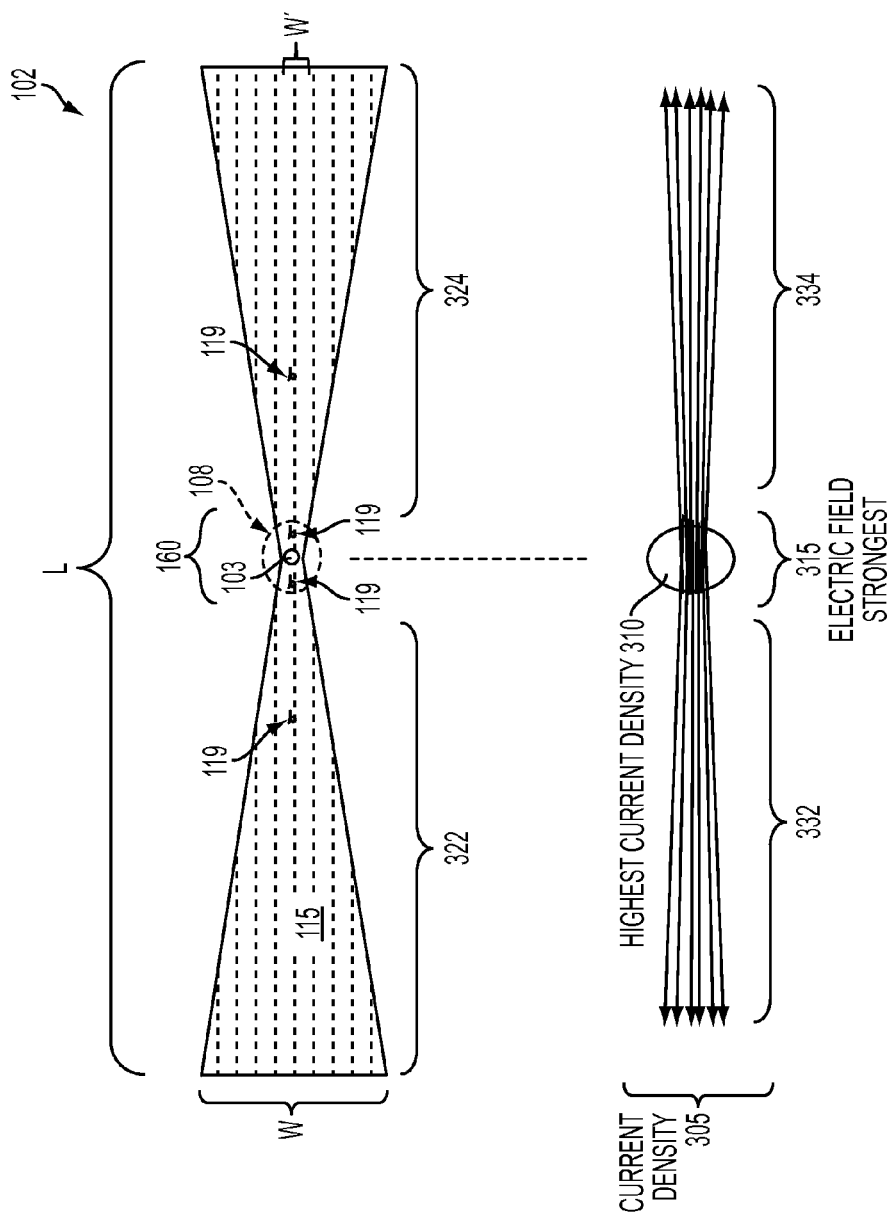
FIG. 3 illustrates details of a micro-fluidic channel in the system according to an embodiment.

Turning to FIG. 3, further details of the micro-fluidic channel 102 (in the system 100) are shown according to an embodiment. Although some elements of the system 100 are omitted for the sake of clarity, it is understood that the system 100 also includes the elements discussed in FIGS. 1 and 2.

In FIG. 3, the micro-fluidic channel 102 is shown with its corresponding current density profile 305 shown below. The example current density profile 305 of the micro-fluidic channel 102 occurs in the micro-fluidic channel 102 when the voltage of the voltage source 107 is applied. The current density profile 305 is the flow of current between the electrodes 105 and 106 in the micro-fluidic channel 102. For example, depending on the direction of the alternating current (AC), the following current flow occurs through the micro-fluidic channel 102 (vice versa for the opposite current flow direction).

When the voltage source 107 is applied, electrical (ionic) current flows from electrode 105 into the ionic buffer 115 in the left (triangular) chamber 322 of the micro-fluidic channel 102, (densely) through the narrowed neck 160 (at the area 108), through the right (triangular) chamber 324, out through electrode 106, and back into the voltage source 107. The electric current flows in the opposite direction when the current alternates, as understood by one skilled in the art. The narrowing shape of the micro-fluidic channel 102 in the middle (e.g., the narrowed neck 160 within area 108) causes the current density to increase at the area 108 as the total current is constant from one end to the other end of the nanochannel 102. For the case of previously mentioned embodiment, the width of the nanochannel 102 is shrunk from 1 mm (e.g., W) at one end (e.g., widest distance at the right and left chambers 322 and 324) to 2 μm (e.g., W') at the center (narrowed neck 160), and the current density increases 500 times from one end to the center of the nanochannel 102. The location of the highest current density in the current density profile 305 is designated as 310. As the electrical field is linearly proportional to the current density, so, the electric field across/in the micro-fluidic channel 102 is highest/strongest at the location 315 (which is within the narrowed neck 160). The low electric field locations 332 and 334 are on either side of the narrowed neck 160.

Note that although the current density profile 305, the highest current density 310 location, the low electric field locations 332 and 334, and the highest electric field 315 intensity are shown separate from the micro-fluidic channel 102, the current density profile 305 (of current flow) and the electric field (with the highest electric field location 315 and low electric field locations 332 and 334) are actually within (and flowing through) the micro-fluidic channel 102.

By having the micro-fluidic channel 102 with a narrowed shape in the middle, the highest electric field intensity location 315 causes the molecules 119 (because of their respective dipoles) to concentrate/gravitate to the area 108 where the nanopore 103 is located, such that the molecules 119 are drawn into the nanopore 103 by the voltage of voltage source 118. The high concentration of molecules 119 at the area 108 (caused by narrowed neck 160 of the micro-fluidic channel 102 resulting in high current density location 310 which results in the highest electric field intensity location 315) is higher than any concentration of molecules 119 caused by the random motion of molecules in the ionic buffer 115. As such, an ultra-low concentration of molecules 119 can be used in the ionic buffer 115 in the micro-fluidic channel 102 as compared to the high concentration of molecules 119 required for the ionic buffer in state of the art designs (based on random motion of the molecules).

Figure 4:
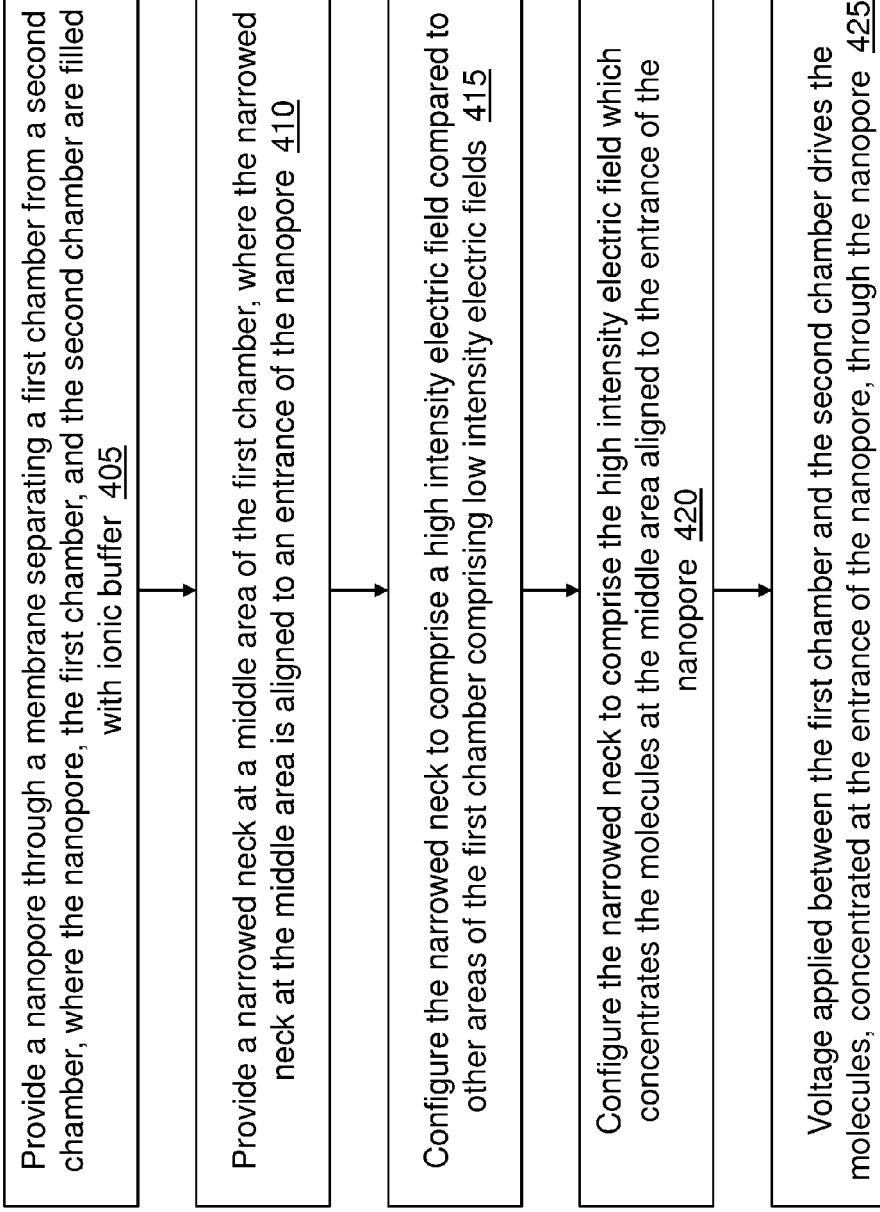
FIG. 4 is a method for concentrating molecules at a narrowed neck of the micro-fluidic chamber and capturing the molecules in the nanopore according to an embodiment.

FIG. 4 is a method 400 for concentrating the molecules 119 at the narrowed neck 160 of the micro-fluidic channel 102 and capturing the molecules 119 in the nanopore 103 according to an embodiment. Reference can be made to FIGS. 1, 2, and 3.

The nanopore 103 is through a membrane (i.e., layer 111) that separates a first chamber (i.e., micro-fluidic channel 102) from a second chamber (i.e., fluidic channel 114), and the nanopore 103, the first chamber, and the second chamber are all filled with ionic buffer 115 at block 405.

The narrowed neck 160 (the area between the left chamber 322 and the right chamber 324) is provided/formed at a middle area of the first chamber, and the narrowed neck 160 at the middle area is aligned to the entrance (top part) of the nanopore 103 at block 410. The micro-fluidic channel 102 includes the molecules 119 that are to enter and pass through the nanopore 103 as discussed herein.

The narrowed neck 160 is configured to comprise a high intensity electric field (location 315) compared to other areas (not at the narrowed neck 160, such as the left chamber 322 and right chamber 324) of the first chamber comprising low intensity electric fields (locations) 332 and 334 at block 415. The high intensity electric field 315 is in (e.g., radiating in) the micro-fluidic channel 102 and is caused by the (AC) voltage of the voltage source 107 because the narrowed neck 160 has the highest current density 310 (of current flow).

The narrowed neck 160 comprising the high intensity electric field 315 concentrates the molecules 119 at the middle area (e.g., designated by area 108 in the micro-fluidic channel 102) aligned to the entrance of the nanopore 103 at block 420.

Voltage (of the voltage source 118) applied between the first chamber (micro-fluidic channel 102) and the second chamber (fluidic cell 114) drives the molecules 119 concentrated at the entrance of the nanopore 103 (e.g., within the area 108) through the nanopore 103 at block 425.

Further, the method includes that the first chamber (micro-fluidic channel 102) comprises a left portion (e.g., left chamber 322) and a right portion (e.g., right chamber 324) with one on either side of the narrowed neck 160. The method includes that the narrowed neck 160 joins a left portion (e.g., left chamber 322) and a right portion (e.g., right chamber 324) of the first chamber.

The method includes that the left portion and the right portion reduce in size as the left portion and right portion approach the narrowed neck 160 (e.g., to form the bowtie shape of the micro-fluidic channel 102). The method includes that the narrowed neck 160 of the first chamber comprises a higher current density (e.g., highest current density 310) than the low current density (to the left and right of the highest current density 310) in the left portion (e.g., the (density of) current flowing in left chamber 322) and the right portion (e.g., the (density of) current flowing in the right chamber 324) of the first chamber (micro-fluidic channel 102). The method includes that the higher current density (e.g., highest current density 310) in the narrowed neck 160 corresponds to (causes) the high intensity electric field (highest/strongest electric filed 315) in the narrowed neck 160 at the middle area (e.g., area 108) to concentrate the molecules 119 at the entrance of the nanopore 103.

The method includes that the molecules 119 are initially filled (e.g., via a syringe or other mechanism) in the left portion (i.e., left chamber 322) and/or the right portion (i.e., right chamber 324) of the first chamber to be captured in the nanopore 103. The method includes that the high intensity electric field 315 (at the area 108) causes the molecules 119 to gravitate to the narrowed neck aligned with the nanopore 103 because of the dipole on the both the charged and non-charged molecules 119 as discussed herein.

The dimensions of the narrowed neck 160 may be configured/designed to contain (only) a single nanopore 130. The width W' of the narrowed neck 160 is less than half (e.g., ⅓, ¼, ⅕, ⅙ ... ¹/₁₀) the width W (of the left portion and the right portion). The width of the left portion and the right portion reduces at an angle to form a width of the narrowed neck 160.

Figure 5:
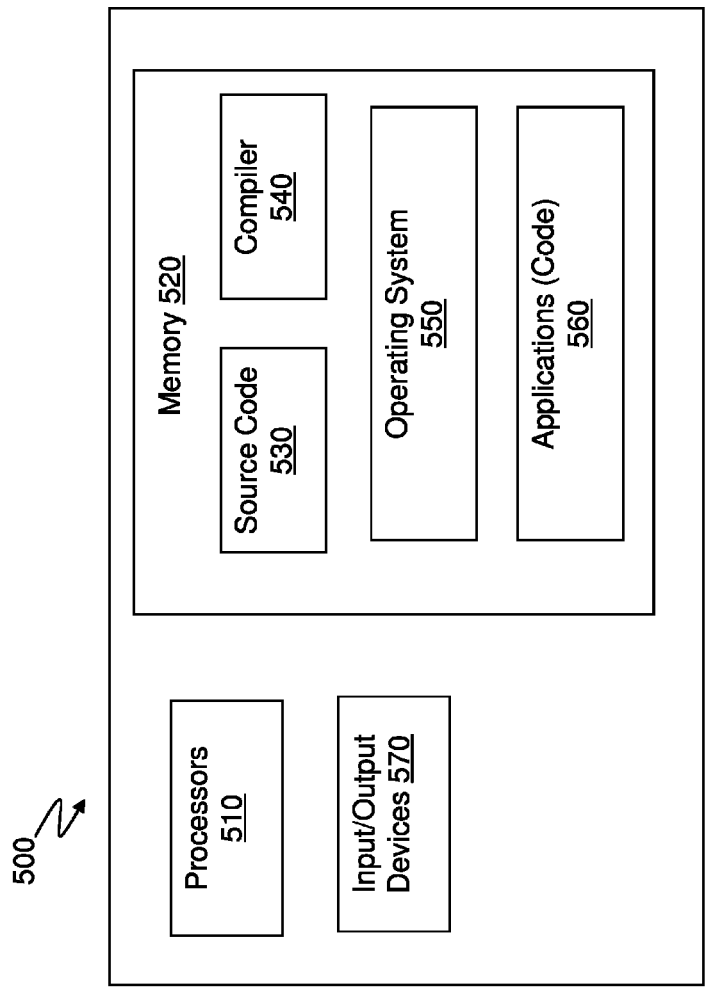
FIG. 5 illustrates an example of a computer having capabilities, which may be included in embodiments.

FIG. 5 illustrates an example of a computer 500 (e.g., as part of a computer setup for testing and analysis) having capabilities, which may be included in exemplary embodiments. Various methods, procedures, modules, flow diagrams, tools, applications, circuits, elements, and techniques discussed herein may also incorporate and/or utilize the capabilities of the computer 500. Moreover, capabilities of the computer 500 may be utilized to implement features of exemplary embodiments discussed herein. One or more of the capabilities of the computer 500 may be utilized to implement, to connect to, and/or to support any element discussed herein (as understood by one skilled in the art) in FIGS. 1-4. For example, the computer 500 which may be any type of computing device and/or test equipment (including ammeters, voltage sources, connectors, etc.). Input/output device 570 (having proper software and hardware) of computer 500 may include and/or be coupled to the nanodevice discussed herein via cables, plugs, wires, electrodes, etc. Also, the communication interface of the input/output devices 570 comprises hardware and software for communicating with, operatively connecting to, reading, and/or controlling voltage sources, ammeters, ionic current, electric fields, etc., as discussed herein. The user interfaces of the input/output device 570 may include, e.g., a track ball, mouse, pointing device, keyboard, touch screen, etc., for interacting with the computer 500, such as inputting information, making selections, independently controlling different voltages sources, and/or displaying, viewing and recording ionic current for each base, molecule, biomolecules, etc.

Generally, in terms of hardware architecture, the computer 500 may include one or more processors 510, computer readable storage memory 520, and one or more input and/or output (I/O) devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a data signal processor (DSP), or an auxiliary processor among several processors associated with the computer 500.

The computer readable memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the computer readable memory 520 may include one or more separate programs, each of which comprises an ordered listing of executable instructions for implementing logical functions. The software in the memory 520 includes a suitable operating system (O/S) 550, compiler 540, source code 530, and one or more applications 560 of the exemplary embodiments. As illustrated, the application 560 comprises numerous functional components for implementing the features, processes, methods, functions, and operations of the exemplary embodiments. The application 560 of the computer 500 may represent numerous applications, agents, software components, modules, interfaces, controllers, etc., as discussed herein but the application 560 is not meant to be a limitation. The application 560 may be a source program, executable program (object code), script, or any other entity comprising a set of instructions to be performed.

The I/O devices 570 may include input devices (or peripherals) such as, for example but not limited to, a mouse, keyboard, scanner, microphone, camera, etc. Furthermore, the I/O devices 570 may also include output devices (or peripherals), for example but not limited to, a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or an intranet. The I/O devices 570 may be connected to and/or communicate with the processor 510 utilizing Bluetooth connections and cables (via, e.g., Universal Serial Bus (USB) ports, serial ports, parallel ports, FireWire, HDMI (High-Definition Multimedia Interface), etc.).

The application 560 can be embodied in any computer-readable medium 520 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

It is understood that the computer 500 includes non-limiting examples of software and hardware components that may be included in various devices, servers, and systems discussed herein, and it is understood that additional software and hardware components may be included in the various devices and systems discussed in exemplary embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for capturing molecules, the method comprising:
    providing a nanopore through a membrane separating a first chamber from a second chamber, the nanopore, the first chamber, and the second chamber being filled with ionic buffer;
    wherein meeting tips of a left triangle and a right triangle unite to form the first chamber;
    aligning an entrance of the nanopore under the meeting tips of the left triangle and the right triangle that form the first chamber;
    wherein the nanopore is formed perpendicular to the meeting tips of the left triangle and the right triangle that form the first chamber;
    configuring a high current density at the meeting tips in order for the meeting tips to comprise a high intensity electric field compared to other areas of the first chamber comprising low intensity electric fields;
    wherein when a first voltage is applied between the left triangle and the right triangle, a narrowness of the meeting tips concentrates the molecules at the meeting tips above the entrance of the nanopore because the narrowness of the meeting tips causes the high current density; and
    resulting from the high current density, configuring the meeting tips to comprise the high intensity electric field which concentrates the molecules at the entrance of the nanopore;
    wherein a second voltage applied between the first chamber and the second chamber drives the molecules, concentrated at the entrance of the nanopore, through the nanopore.

2. The method of claim 1, wherein the first chamber comprises a left portion and a right portion with one on either side of the meeting tips.

3. The method of claim 1, wherein the meeting tips join a left portion and a right portion of the first chamber.

4. The method of claim 3, wherein the left portion and the right portion reduce in size as the left portion and the right portion approach the meeting tips.

5. The method of claim 3, wherein the meeting tips of the first chamber comprises a higher current density than a low current density in the left portion and the right portion of the first chamber.

6. A system for capturing molecules, the system comprising:
- a nanopore through a membrane separating a first chamber from a second chamber, the nanopore, the first chamber, and the second chamber being filled with ionic buffer;
- meeting tips of a left triangle and a right triangle which unite to form the first chamber, an entrance of the nanopore being aligned under the meeting tips of the left triangle and the right triangle;
- the nanopore formed perpendicular to the meeting tips of the left triangle and the right triangle that form the first chamber;
- the meeting tips comprise a high current density in order for the meeting tips to comprise a high intensity electric field compared to other areas of the first chamber comprising low intensity electric fields;
- wherein when a first voltage is applied between the left triangle and the right triangle, a narrowness of the meeting tips concentrates the molecules at the meeting tips above the entrance of the nanopore because the narrowness of the meeting tips causes the high current density; and
- the meeting tips comprising the high intensity electric field concentrating the molecules at the entrance of the nanopore, resulting from the high current density;
- wherein a second voltage applied between the first chamber and the second chamber drives the molecules, concentrated at the entrance of the nanopore, through the nanopore.

7. The system of claim 6, wherein the first chamber comprises a left portion and a right portion with one on either side of the meeting tips.

8. The system of claim 7, wherein the molecules are initially filled in at least one of the left portion and the right portion of the first chamber to be captured in the nanopore.

9. The system of claim 8, wherein the high intensity electric field causes the molecules to gravitate to the meeting tips aligned with the nanopore.

10. The system of claim 6, wherein a width of the meeting tips is 1 micrometer.

11. The system of claim 6, wherein a width of the meeting tips is 2 micrometers.

12. The system of claim 6, wherein dimensions of the meeting tips are configured to contain a single nanopore.

13. The system of claim 6, wherein the meeting tips join a left portion and a right portion of the first chamber.

14. The system of claim 13, wherein the left portion and the right portion reduce in size as the left portion and the right portion approach the meeting tips.

15. The system of claim 13, wherein a width of the meeting tips is less than half a width of the left portion and the right portion.

16. The system of claim 13, wherein a width of the left portion and the right portion reduces at an angle to form a width of the meeting tips.

17. The system of claim 13, wherein the meeting tips of the first chamber comprise a higher current density than a low current density in the left portion and the right portion of the first chamber.

18. The system of claim 17, wherein the higher current density in the meeting tips correspond to the high intensity electric field in the meeting tips to concentrate the molecules at the entrance of the nanopore.

19. The system of claim 17, wherein the left portion comprises a low intensity electric field.

20. The system of claim 17, wherein the right portion comprises a low intensity electric field.

* * * * *